United States Patent [19]
Damiani et al.

[11] Patent Number: 6,022,488
[45] Date of Patent: Feb. 8, 2000

[54] HEAT TRANSFER FLUID CONTAINING 1,1-DIPHENYL ETHANE AND DIPHENYL OXIDE

[75] Inventors: Robert A. Damiani, St. Charles; Michael R. Damiani, Geneva, both of Ill.

[73] Assignee: Radco Industries, Inc., LaFox, Ill.

[21] Appl. No.: 09/231,435

[22] Filed: Jan. 14, 1999

Related U.S. Application Data

[63] Continuation-in-part of application No. 09/156,744, Sep. 17, 1998, abandoned.

[51] Int. Cl.⁷ .................................................. C09K 5/00
[52] U.S. Cl. ................................................ 252/73; 585/3
[58] Field of Search .................. 252/73; 585/3, 585/26

[56] References Cited

U.S. PATENT DOCUMENTS

| | | | |
|---|---|---|---|
| 3,931,028 | 1/1976 | Jackson et al. | 252/73 |
| 3,966,626 | 6/1976 | Jackson et al. | 252/73 |
| 4,011,274 | 3/1977 | Watanabe et al. | 252/73 |
| 4,260,506 | 4/1981 | Munch et al. | 252/78.1 |
| 4,318,690 | 3/1982 | Duncan | 432/41 |
| 4,622,160 | 11/1986 | Buske et al. | 252/73 |
| 5,075,022 | 12/1991 | Gambell et al. | 252/73 |
| 5,347,815 | 9/1994 | Jones | 62/46.2 |
| 5,611,394 | 3/1997 | Mizuta et al. | 165/89 |

OTHER PUBLICATIONS

Chemical Abstracts, AN 87:184102, "Acid–catalyzed reactions of aromatic hydrocarbons with alkanes and cycloalkanes", Miethchen et al, 1977.

*Primary Examiner*—Christine Skane
*Attorney, Agent, or Firm*—Lee, Mann, Smith, McWilliams, Sweeney & Ohlson

[57] ABSTRACT

A heat transfer fluid having high heat capacity, high thermal loading capacity, low viscosity and low freezing point includes diphenyl oxide and 1,1 diphenyl ethane in broad proportions.

12 Claims, No Drawings

HEAT TRANSFER FLUID CONTAINING 1,1-DIPHENYL ETHANE AND DIPHENYL OXIDE

RELATED APPLICATIONS

This is a continuation-in-part of patent application Ser. No. 09/156,744, filed on Sep. 17, 1998, now abandoned.

BACKGROUND OF THE INVENTION

Heat transfer fluids, sometimes referred to as heat transfer media, are heat transfer agents which are used in cooling and heating circuits and in heat recovery units. There may be other uses for such fluids and as such, they are required or expected to have a high heat transfer capacity, high thermal loading capacity and adequate thermal stability for the operating range. It is also desirable to have fluids which can stand very high heat and yet have a low freezing point while being inert.

There have been prior art heat transfer fluids which have some of the proper characteristics at high temperatures and at low temperatures and are chemically inert. The eutectic mixture of 73% diphenyl oxide and 27% biphenyl commonly known as DowthermA, is currently one of the largest volume heat transfer fluids sold worldwide. Other widely used fluids are a mixture of hydrogenated terphenyl and quatraphenyl and dibenzyl toluene.

It has, however, become desirable to get away from the available heat transfer fluids which have previously been used for a number of reasons, one of which is the current requirements of the EPA as to reportable spill quantity for biphenyl. It is also desirable to provide a heat transfer fluid which has a higher resistance to heat and a lower freezing capability, or a combination of both.

SUMMARY OF THE INVENTION

It is the object of the present invention to overcome any disadvantages of the prior art heat transfer fluids and to eliminate the use of biphenyls to obviate the need for spill reportage under the EPA regulations. It is also an object of the present invention to provide a more useful heat transfer fluid insofar as heat levels and freezing points are concerned and to additionally create heat transfer fluids having better stability under various conditions.

To achieve the objects of this invention, therefore, it has been discovered that a mixture in broad proportions of diphenyl oxide (DPO) sometimes referred to as diphenyl ether, which has a structural formula of $C_6H_5OC_6H_5$ and 1,1 diphenyl ethane (DPE) having a structural formula of $CH_3CH(C_6H_5)_2$ in varying amounts but generally a larger amount of either diphenyl oxide or 1,1 diphenyl ethane to substantially equal amounts of diphenyl oxide and 1,1 diphenyl ethane. In other words, fluid with an excess of 1,1 diphenyl ethane over diphenyl oxide and vice versa provides a useful heat transfer fluid. However, the preferred ratios of about 5 to 50% 1,1 diphenyl ethane to 95–50% diphenyl oxide provides a heat transfer fluid with remarkable improvements over the prior art fluids, i.e., higher heat transfer coefficients and lower freezing points as well as greater thermal stability. The composition recited above though similar to the prior art compositions already mentioned, is not shown in the prior art, has not been used, and as previously stated, is remarkably better than the prior art compositions so much so that it may be considered that the performance of this material is unexpected and even synergistic.

Although a mixture of 1,1 diphenyl ethane and diphenyl oxide, as outlined above, is the preferred embodiment of the invention, it is known to one of ordinary skill in the art that certain impurities and/or isomers can be added in small quantities to this preferred heat transfer mixture without affecting the performance characteristics of the invention, as discussed more fully below. In particular, it is known that XCELTHERM XT, a commercially available product consisting essentially of a mixture of 92–95% 1,1 diphenyl ethane, 7–4% 1,2 diphenyl ethane, and 1% diphenyl methane can be substituted for the pure 1,1 diphenyl ethane material of the preferred heat transfer mixture without essentially affecting the overall heat transfer characteristics of the resultant mixture when compared to the expected performance characteristics of the preferred embodiment of the invention. The XCELTHERM XT product is processed by the assignee of this patent, Radco Industries, Inc. of LaFox, Ill. Accordingly, it is known that a material consisting essentially of 1,1 diphenyl ethane and smaller amounts of other impurities and/or isomers can be substituted for the pure 1,1 diphenyl ethane of the preferred composition.

Thermal stability tests of mixtures of 1,1 diphenyl ethane and diphenyl oxide alone have been conducted. However, in view of all of the materials that have been used prior to the development of the heat transfer fluid of this invention, it has been decided to run confirmatory tests as to the novelty and unexpected improvement provided by the heat transfer fluid combination of this invention, namely, diphenyl ether and 1,1 diphenyl ethane. The combinations that have been tested are terphenyls, dibenzyl toluene, the diphenyl oxide-biphenyl mixture and the compositions of the invention to determine which fluid provides the best heat transfer results. It should be noted here that the terms "diphenyl ether," "diphenyl oxide" and "DPO" will be used throughout this specification as indicating the same chemical component while "DPE" will be used as indicating 1,1 diphenyl/ethane.

Many industrial production processes require the use of a heat transfer fluid in the temperature range of 600° F.–700° F. The heat transfer fluids used in this temperature range fall into two broad classifications:

1. Liquid phase fluids-characterized by low vapor pressure with heat transfer occurring in the liquid phase.
2. Liquid/vapor phase fluids-characterized by higher vapor pressures with heat transfer occurring in the liquid or vapor phase.

Three distinct chemistries, all aromatic, define the most widely used fluids worldwide in this temperature classification.

1. 73% diphenyl oxide/27% biphenyl mixture—a liquid/vapor phase fluid.
2. Hydrogenated terphenylquatraphenyl mixture—a liquid phase fluid.
3. Dibenzyl Toluene—liquid phase fluid.

The primary factors which define a fluid's use range are:

1. Thermal Stability.
2. Pour/crystalizing point.

The primary factor which defines its effectiveness within it's operating range is:

1. Heat transfer coefficient—the ability to upload, transfer, and download heat/unit time-area at a given temperature.

A major factor in a fluid's use is its environmental impact—whether it is regulated as a hazardous chemical. Since these fluids may from time-to-time leak from the system or be subject to the over-the-road spillage, those fluids regarded as "hazardous" by the EPA incur additional potential liabilities, and therefore expense, in their use.

Disadvantages of the various types of fluids:

Terphenyls:
1. Can only be used to 650° F. due to lower thermal stability
2. Relatively low heat transfer coefficient.
3. Can only be used in the liquid phase.

Dibenzyl Toluene:
1. Can only be used to 660° F. due to lower thermal stability.
2. Relatively low heat transfer coefficient.
3. Can only be used in the liquid phase.

DPO/BIP:
1. High pour/crystallizing point—results in system shutdown problems especially in colder climates.
2. Contains biphenyl—environmentally hazardous quantity in spills of over 100 lbs. of biphenyl.

The objective is to provide a single fluid that will operate in either the liquid/vapor phase with acceptable thermal stability to 700° F. offering a sufficiently low pour/crystallizing point, high heat transfer coefficient, and minimal environmental exposure.

The heat transfer coefficient is a primary measure of the ability of a heat transfer medium to transfer heat. Therefore, a fluid having a higher heat transfer coefficient at a given temperature may be expected to transfer more heat/unit heat exchange surface area than another with a lower heat transfer coefficient at the same temperature. As such, a higher production rate or a decrease in production time is possible with the fluid having the higher heat transfer coefficient.

Table 1 represents a comparison of the heat transfer coefficients of the common types of heat transfer fluids with the heat transfer coefficients of this invention when the DPO is in excess of or equal to the DPE.

TABLE 1

Comparison of Heat Transfer Coefficients
HEAT TRANSFER COEFFICIENTS
Schedule 40 2' pipe (2.066' ID) @ 7 ft/sec flow rate

| TEMP (° F.) | Terphenyl[1] | DBT[2] | 73/27 DPO/BIP | 95/5 DPO/DPE | 85/15 DPO/DPE | 75/25 DPO/DPE | 50/50 DPO/DPE |
|---|---|---|---|---|---|---|---|
| 600 | 360.66 | 369.86 | 445.65 | 452.16 | 447.24 | 443.79 | 442.23 |
| 625 | 365.46 | 377.52 | 444.77 | 454.05 | 449.45 | 445.47 | 444.73 |
| 650 | 369.05 | 385.29 | 442.68 | 455.37 | 450.36 | 447.53 | 445.68 |
| 675 | N/A[1] | N/A[2] | 438.85 | 457.06 | 451.31 | 447.83 | 444.83 |
| 700 | N/A[1] | N/A[2] | 433.68 | 456.35 | 450.49 | 448.16 | 441.46 |

[1]Maximum use temperature recommended by fluid supplier is 650° F.
[2]Maximum use temperature recommended by fluid supplier is 66° F.
Heat transfer coefficient is a measure of the ability of a fluid to uptake, transport, and download BTU. The higher the heat transfer coefficient relative to another product the greater the ability of the fluid with the higher heat transfer coefficient to transfer heat per unit area of heat exchange surface.

Table 2 represents a comparison of the heat transfer coefficients of the common types of heat transfer fluids with the heat transfer coefficients of this invention when DPE is in excess of DPO.

TABLE 2

Comparison of Heat Transfer Coefficients
HEAT TRANSFER COEFFICIENTS
Schedule 40 2' pipe (2.066' ID) @ 7 ft/sec flow rate

| TEMP (° F.) | Terphenyl[1] | DBT[2] | 73/27 DPO/BIP | 95/5 DPE/DPO | 85/15 DPE/DPO | 75/25 DPE/DPO |
|---|---|---|---|---|---|---|
| 600 | 360.66 | 369.86 | 445.65 | 415.17 | 419.11 | 423.08 |
| 625 | 365.46 | 377.52 | 444.77 | 416.55 | 420.55 | 424.59 |
| 650 | 369.05 | 385.29 | 442.65 | 441.21 | 450.14 | 447.67 |

[1]Maximum use temperature recommended by fluid supplier is 650° F.
[2]Maximum use temperature recommended by fluid supplier is 660 ° F.
Heat transfer coefficient is a measure of the ability of a fluid to uptake, transport, and download BTU. The higher the heat transfer coefficient relative to another product the greater the ability of the fluid with the higher beat transfer coefficient to transfer beat per unit area of heat exchange surface.

The following Tables 1A–1E and 2A–2C are derived from heat transfer coefficients in Tables 1 and 2. (+)% shows the percentage increase in heat transfer coefficient of DPO/DPE-DPE/DPO relative to the indicated product. (−)% shows the percentage decrease in heat transfer coefficient of DPO/DPE-DPE/DPO relative to the indicated product.

TABLE 1A

% COMPARISON OF HEAT TRANSFER COEFFICIENTS 600° F.

| Product | 95/5 DPO/DPE | 85/15 DPO/DPE | 75/25 DPO/DPE | 50/50 DPO/DPE |
|---|---|---|---|---|
| Terphenyl | +25.37 | +24.01 | +23.05 | +22.62 |
| Dibenzyl Toluene | +22.25 | +20.92 | +19.99 | +19.57 |
| 73/27 DPO/BIP | +1.46 | +0.36 | −0.42 | −0.77 |

TABLE 1B

% COMPARISON OF HEAT TRANSFER COEFFICIENTS 625° F.

| Product | 95/5 DPO/DPE | 85/15 DPO/DPE | 75/25 DPO/DPE | 50/50 DPO/DPE |
|---|---|---|---|---|
| Terphenyl | +24.24 | +22.98 | +21.89 | +21.69 |
| Dibenzyl Toluene | +20.27 | +19.05 | +18.00 | +17.80 |
| 73/27 DPO/BIP | +2.09 | +1.05 | +0.16 | −0.01 |

TABLE 1C

% COMPARISON OF HEAT TRANSFER COEFFICIENTS 650° F.

| Product | 95/5 DPO/DPE | 85/15 DPO/DPE | 75/25 DPO/DPE | 50/50 DPO/DPE |
|---|---|---|---|---|
| Terphenyl | +23.39 | +22.03 | +21.27 | +20.76 |
| Dibenzyl Toluene | +18.19 | +16.89 | +16.15 | +15.67 |
| 73/27 DPO/BIP | +2.87 | +1.73 | +1.11 | +0.68 |

TABLE 1D

% COMPARISON OF HEAT TRANSFER COEFFICIENTS 675° F.

| Product | 95/5 DPO/DPE | 85/15 DPO/DPE | 75/25 DPO/DPE | 50/50 DPO/DPE |
|---|---|---|---|---|
| Terphenyl | N/A[1] | N/A | N/A | N/A |
| Dibenzyl Toluene | N/A[2] | N/A | N/A | N/A |
| 73/27 DPO/BIP | +4.15 | +2.84 | +2.05 | +3.36 |

[1]Manufacturer recommends highest use temperature of 650° F.
[2]Manufacturer recommends highest use temperature of 660° F.

TABLE 1E

% COMPARISON OF HEAT TRANSFER COEFFICIENTS 700° F.

| Product | 95/5 DPO/DPE | 85/15 DPO/DPE | 75/25 DPO/DPE | 50/50 DPO/DPE |
|---|---|---|---|---|
| Terphenyl | N/A[1] | N/A | N/A | N/A |
| Dibenzyl Toluene | N/A[2] | N/A | N/A | N/A |
| 73/27 DPO/BIP | +5.23 | +3.88 | +3.35 | +1.79 |

[1]Manufacturer recommends highest use temperature of 650° F.
[2]Manufacturer recommends highest use temperature of 660° F.

TABLE 2A

% COMPARISON OF HEAT TRANSFER COEFFICIENTS 600° F.

| Product | 95/5 DPE/DPO | 85/15 DPE/DPO | 75/25 DPE/DPO |
|---|---|---|---|
| Terphenyl[1] | +15.11 | +16.20 | +17.31 |
| Dibenzyl[2] Toluene | +12.25 | +13.32 | +14.39 |
| 73/27 DPO/BIP | −7.34 | −6.33 | −5.06 |

[1]Manufacturer recommends highest use temperature of 650° F.
[2]Manufacturer recommends highest use temperature of 660° F.

TABLE 2B

% COMPARISON OF HEAT TRANSFER COEFFICIENTS 625° F.

| Product | 95/5 DPE/DPO | 85/15 DPE/DPO | 75/25 DPE/DPO |
|---|---|---|---|
| Terphenyl[1] | +13.98 | +15.07 | +16.18 |
| Dibenzyl[2] Toluene | +10.34 | +11.40 | +12.47 |
| 73/27 DPO/BIP | −6.77 | −5.76 | −4.75 |

[1]Manufacturer recommends highest use temperature of 650° F.
[2]Manufacturer recommends highest use temperature of 660° F.

TABLE 2C

% COMPARISON OF HEAT TRANSFER COEFFICIENTS 650° F.

| Product | 95/5 DPE/DPO | 85/15 DPE/DPO | 75/25 DPE/DPO |
|---|---|---|---|
| Terphenyl[1] | +19.55 | +21.97 | +21.30 |
| Dibenzyl[2] Toluene | +14.51 | +16.83 | +16.19 |
| 73/27 DPO/BIP | −0.33 | +1.68 | +1.12 |

[1]Manufacturer recommends highest use temperature of 650° F.
[2]Manufacturer recommends highest use temperature of 660° F.

Pour Point/Crystallizine Point Was Determined For The Various Fluids Utilizing ASTM D97.

TABLE 2[1]

Comparison of Pour Points/Crystallizing Points of the various fluids

POUR/CRYSTALLIZING POINTS

| Product | Temp ° F. |
| --- | --- |
| Terphenyl | −15 |
| Dibenzyl Toluene | −50 |
| 73/27 DPO/BIP | 54 |
| 95/5 DPO/DPE | 54 |
| 85/15 DPO/DPE | 40 |
| 75/25 DPO/DPE | 27 |
| 50/50 DPO/DPB | 10 |
| 95/5 DPE/DPO | −30 |
| 85/15 DPE/DPO | −21 |
| 75/25 DPE/DPO | −13 |

[1]ASTM D97 Testing Method

Thermal stability may be defined as the resistance of chemical bonds to thermal cracking. A fluid exhibiting greater thermal stability relative to another at any given temperature will provide increased fluid life and a decreased potential for system fouling caused by thermal degradation by products.

The Thermal stability tests were conducted using the Ampule Test Procedure.

The Ampule Test is generally accepted as an industry standard for the testing of relative thermal stability between heat transfer fluids Although there is no standard ASTM-type Ampule Test defined, the data generated by such testing has proven reliable over the course of many years. Variations between methods exist as to the composition and diameter of the ampules, the method by which the oxygen is removed from the ampule, the sample size, and the temperature run. However, with the exception of those methods which do not properly provide for oxygen removal, the relative results are reliable as long as uniform temperatures are maintained across the oven. The data serves to define the thermal stability performance differences between fluids in any given system.

The procedure for the Ampule Test is as follows:
Purpose: To determine relative thermal stability by measuring the thermal decomposition of heat transfer fluids under like conditions in the absence of oxygen.

A. SAMPLE PREPARATION
1. Cut 6 inch lengths of clean, dry 316 ss tubing (½ OD×5/16 ID) in sufficient number for two samples of each fluid to be tested.
2. Wash the insides of the tubes with Xylol followed by Acetone, air blow and allow to dry.
3. Utilizing stainless steel swagelok fittings, cap one end of each tube.
4. Utilizing a metal etching tool, label the tubes 1A, 1B, etc.

B. SAMPLE PREPARATION
1. Place 5 ml of each sample into individual ampules (sample #1—5 ml into Ampule marked 1A, 5 ml into Ampule marked 1B, etc.) and note the product name of the sample and its designated Ampule.
2. Retain 5 ml of each sample in a glass vial and set aside as a reference.
3. Place the filled ampules vertically in a metal tube rack placing the samples on either side of the rack.

C. OXYGEN REMOVAL
Tube Sparging Procedure
1. Place filled, uncapped tubes (in the rack) into the glove box.
2. Place caps and required tools into the glove box.
3. Connect nitrogen line to deflated bag with ⅛" tubing.
4. Install a board as a work surface.
5. Start nitrogen at 60 PSI on the regulator.
6. After the bag begins to inflate, seal the open end with tape as per instructions.
7. After bag is fully inflated, open vent valve.
8. Reduce pressure from the regulator to 30 PSI.
9. After bag has inflated place the sparging tube (30 PSI nitrogen) into each tube for 1 minute.
10. Cap each tube immediately after sparging with nitrogen.

D. THERMAL STRESS
1. Place the prepared tube rack of ampules in an oven capable of holding the selected temperature at ±1° F. and with no more than ±½° F. temperature gradient across the oven.
2. Bring the oven to the desired temperature and maintain this temperature under the parameters defined above the 336 hrs. (Two Weeks).
3. At the end of the time period shut down the oven and allow Ampules to cool for 24 hours undisturbed.

E. ANALYSIS
1. Uncap each ampule and decant into a properly labeled 15 ml glass vial.
2. Analyze each retained reference sample and its appropriate processed samples utilizing using ASTMD2997 Simdis Gas Chromatography Methodology.
3. Calculate the % highlow boiler of each sample relative to the reference sample The results of the Thermal Stability Test are as follows:
Thermal Stability—Resistance of chemical bonds to thermal cracking at any given temperature DPO is in excess of or equal to DPE.

TABLE 3[4]

Comparison of Thermal Stability
336 Hour Ampule Test
% THERMAL DECOMPOSITION

| TEMP (° F.) | Terphenyl[1] | DBT[2] | 73/27 DPO/BIP | 95/5 DPO/DPE | 85/15 DPO/DPE | 80/20 DPO/DPE | 75/25 DPO/DPE | 50/50 DPO/DPE |
| --- | --- | --- | --- | --- | --- | --- | --- | --- |
| 600 | 0.87 | 0.59 | 0.004 | 0.002 | 0.002 | 0.01 | 0.01 | 0.004 |
| 625 | 1.36 | 0.99 | 0.01 | 0.01 | 0.01 | 0.02 | 0.03 | 0.03 |
| 650 | 3.50 | 2.29 | 0.04 | 0.03 | 0.06 | 0.12 | 0.15 | 0.22 |

TABLE 3[4]-continued

Comparison of Thermal Stability
336 Hour Ampule Test
% THERMAL DECOMPOSITION

| TEMP (° F.) | Terphenyl[1] | DBT[2] | 73/27 DPO/BIP | 95/5 DPO/DPE | 85/15 DPO/DPE | 80/20 DPO/DPE | 75/25 DPO/DPE | 50/50 DPO/DPE |
|---|---|---|---|---|---|---|---|---|
| 675 | N/A[1] | N/A[2] | 0.11 | 0.13 | 0.37 | 0.60 | 0.88 | 1.60 |
| 700 | N/A[1] | N/A[2] | 0.49 | 0.48 | 1.67 | 2.89 | 4.50 | 7.42 |

[1]Maximum use temperature recommended by fluid supplier is 650° F.
[2]Maximum use temperature recommended by fluid supplier is 660° F.
[3]Maximum use temperature recommended by fluid supplier is 750° F.
[4]Sample analysis by ASTM D2997

Thermal Stability-Resistance of chemical boards to thermal cracking at any given temperature when DPE is in excess of DPO.

TABLE 4[4]

Comparison of Thermal Stability
336 Hour Ampule Test
% THERMAL DECOMPOSITION

| TEMP (° F.) | Terphenyl[1] | DBT[2] | 73/27 DPO/BIP | 95/5 DPE/DPO | 85/15 DPE/DPO | 75/25 DPE/DPO |
|---|---|---|---|---|---|---|
| 600 | 0.87 | 0.59 | 0.004 | 0.09 | 0.01 | 0.01 |
| 625 | 1.36 | 0.99 | 0.01 | 0.27 | 0.15 | 0.09 |
| 650 | 3.50 | 2.29 | 0.04 | 1.40 | 1.02 | 0.85 |

[1]Maximum use temperature recommended by fluid supplier is 650° F.
[2]Maximum use temperature recommended by fluid supplier is 660° F.
[3]Maximum use temperature recommended by fluid supplier is 750° F.
[4]Sample analysis by ASTM D2997

Thus, the tests ofthese various chemical compositions demonstrate that the diphenyl ether or oxide/1,1 diphenyl ethane mixture is superior insofar as heat transfer co-efficient and thermal stability is concerned with respect to terphenyl and dibenzyl toluene and equivalent or superior in heat transfer coefficient to the eutectic mixture of diphenyl oxide and biphenyl while providing lower point and lastly, avoids the use of biphenyl which is now important in the industry.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A biphenyl-free heat transfer fluid comprising a mixture of diphenyl oxide and 1,1 diphenyl ethane.

2. The heat transfer fluid of claim 1 wherein said 1,1 diphenyl ethane is comprised of a mixture of 1,1 diphenyl ethane and one or more impurities.

3. The heat transfer fluid of claim 2 wherein said one or more impurities can be selected from the group consisting of diphenyl methane and 1,2 diphenyl ethane.

4. The heat transfer fluid of claim 1 wherein said 1,1 diphenyl ethane consists essentially of a mixture of 1,1 diphenyl ethane, 1,2 diphenyl ethane and diphenyl methane.

5. The heat transfer fluid of claim 4 wherein said 1,1 diphenyl ethane is about 92 to 95 weight percent of said mixture, said 1,2 diphenyl ethane is about 7 to 4 weight percent of said mixture, and said diphenyl methane is about 1 weight percent of said mixture.

6. The heat transfer fluid of claim 1 wherein the amount of said 1,1 diphenyl ethane ranges from an excess to equal to said diphenyl oxide.

7. The heat transfer fluid of claim 1 wherein the amount of said diphenyl oxide ranges from an excess to equal to said 1,1 diphenyl ethane.

8. The heat transfer fluid of claim 1 wherein said diphenyl oxide is present from 95–5% by weight of said mixture and said 1,1 diphenyl ethane is present from 5–50% by weight of said mixture.

9. The heat transfer fluid of claim 8 wherein said diphenyl oxide is present in about 95% by weight of said mixture and said 1,1 diphenyl ethane is present in about 5% by weight of said mixture.

10. The heat transfer fluid of claim 8 wherein said diphenyl oxide is present in about 85% by weight of said imxture and said 1,1 diphenyl ethane is present in about 15% by weight of said mixture.

11. The heat transfer fluid of claim 8 wherein said diphenyl oxide is present in about 75% by weight of said mixture and said 1,1 diphenyl ethane is present in about 25% by weight of said mixture.

12. The heat transfer fluid of claim 8 wherein said diphenyl oxide is present in about 50% by weight of said mixture and said 1,1 diphenyl ethane is present in about 50% by weight of sald mixture.

* * * * *